(12) United States Patent
Cheng et al.

(10) Patent No.: US 9,137,661 B2
(45) Date of Patent: Sep. 15, 2015

(54) AUTHENTICATION METHOD AND APPARATUS FOR USER EQUIPMENT AND LIPA NETWORK ENTITIES

(75) Inventors: Ching-Wen Cheng, Tainan (TW); Yung-Chun Lin, Hsinchu (TW); Jia-Wei Wu, Taipei (TW); Shun-Ren Yang, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 589 days.

(21) Appl. No.: 13/541,123

(22) Filed: Jul. 3, 2012

(65) Prior Publication Data

US 2013/0091552 A1  Apr. 11, 2013

(30) Foreign Application Priority Data

Oct. 6, 2011  (TW) .............................. 100136290 A

(51) Int. Cl.
*H04W 12/06* (2009.01)
*H04L 29/06* (2006.01)
*H04W 8/06* (2009.01)

(52) U.S. Cl.
CPC ........... *H04W 12/06* (2013.01); *H04L 63/0869* (2013.01); *H04W 8/06* (2013.01)

(58) Field of Classification Search
CPC ..... H04W 12/06; H04W 8/06; H04L 63/0869
See application file for complete search history.

(56) References Cited

U.S. PATENT DOCUMENTS 6,785,256 B2 * 8/2004 O'Neill ......................... 370/338
7,218,940 B2 * 5/2007 Niemenmaa et al. ...... 455/456.1
(Continued)

FOREIGN PATENT DOCUMENTS

| CN | 101841886 A | 9/2010 |
|---|---|---|
| CN | 101909297 A | 12/2010 |

(Continued)

OTHER PUBLICATIONS

English Translation of the Taiwan Notice of Allowance, Serial No. TW100136290, Dec. 30, 2013, pp. 1-3.*

(Continued)

*Primary Examiner* — Jung Kim
*Assistant Examiner* — James J Wilcox
(74) *Attorney, Agent, or Firm* — Rabin & Berdo, P.C.

(57) ABSTRACT

An authentication method for user equipment (UE) and LIPA network entities is applicable to a cross-LIPA communication environment having an UE end, a visiting LIPA network entity end ($LIPA_V$), and a home LIPA network entity end ($LIPA_H$). The UE end successfully registers to a core network (CN) via the $LIPA_V$, thereby attaining mutual trust relationship between the UE end and the $LIPA_V$. The UE end successfully registers to the CN via the $LIPA_H$, thereby attaining mutual trust relationship between the UE end and the $LIPA_H$. The $LIPA_H$ requests the UE end via the $LIPA_V$ for successfully re-authenticating the CN, thereby attaining mutual trust relationship between the $LIPA_V$ and the $LIPA_H$.

7 Claims, 14 Drawing Sheets

(56) References Cited

U.S. PATENT DOCUMENTS

| | | | |
|---|---|---|---|
| 7,620,041 B2 | 11/2009 | Dunn et al. | |
| 8,179,840 B2 * | 5/2012 | O'Neill | 370/328 |
| 8,307,205 B2 * | 11/2012 | Cha et al. | 713/166 |
| 8,565,764 B2 * | 10/2013 | Pudney et al. | 455/435.1 |
| 8,676,155 B2 * | 3/2014 | Fan et al. | 455/406 |
| 8,792,450 B2 * | 7/2014 | Ophir et al. | 370/331 |
| 8,855,045 B2 * | 10/2014 | Zhou et al. | 370/326 |
| 2003/0196107 A1 | 10/2003 | Robertson et al. | |
| 2005/0030958 A1 * | 2/2005 | Laiho et al. | 370/401 |
| 2008/0189774 A1 | 8/2008 | Ansari et al. | |
| 2009/0313466 A1 | 12/2009 | Naslund et al. | |
| 2010/0128708 A1 * | 5/2010 | Liu et al. | 370/338 |
| 2010/0199332 A1 * | 8/2010 | Bachmann et al. | 726/4 |
| 2010/0263017 A1 * | 10/2010 | Matti et al. | 726/1 |
| 2011/0010543 A1 * | 1/2011 | Schmidt et al. | 713/168 |
| 2011/0035592 A1 * | 2/2011 | Cha et al. | 713/169 |
| 2011/0041003 A1 * | 2/2011 | Pattar et al. | 714/4.3 |
| 2011/0167270 A1 * | 7/2011 | Lee et al. | 713/170 |
| 2011/0171953 A1 * | 7/2011 | Faccin et al. | 455/426.1 |
| 2011/0263222 A1 * | 10/2011 | Farnsworth et al. | 455/410 |
| 2011/0300852 A1 * | 12/2011 | Krishnaswamy et al. | 455/422.1 |
| 2012/0057574 A1 * | 3/2012 | Horn | 370/338 |
| 2012/0207137 A1 * | 8/2012 | Zhou et al. | 370/331 |

FOREIGN PATENT DOCUMENTS

| | | |
|---|---|---|
| CN | 102111903 A | 6/2011 |
| EP | 1113640 B1 | 11/2006 |
| EP | 1364494 B1 | 12/2009 |

OTHER PUBLICATIONS

Taiwan Patent Office, Notice of Allowance, Patent Application Serial No. TW100136290, Dec. 30, 2013, Taiwan.

* cited by examiner

| | |
|---|---|
| 502 | UE sends a request to $LIPA_V$ for requesting establishing a connection to $LIPA_H$ |
| 504 | $LIPA_V$ sends a specific message of security function request to $LIPA_H$ |
| 505 | $LIPA_H$ transmits the specific message of security function request to CN |
| 506 | CN trusts $LIPA_H$, so accepts the security function request sent by $LIPA_H$, and accordingly sends user authentication request to $LIPA_H$ |
| 507 | $LIPA_H$ forwards the user authentication request to $LIPA_V$ |
| 508 | $LIPA_V$ sends user authentication request to the UE |
| 510 | UE sends user authentication response to $LIPA_V$ according to the verification result |
| 511 | $LIPA_V$ sends the verification result to $LIPA_H$ |
| 512 | $LIPA_H$ sends the user authentication response message to CN |
| 514 | CN sends security mode command to $LIPA_H$ |
| 516 | $LIPA_H$ forwards security mode command to $LIPA_V$ |
| 518 | $LIPA_V$ sends a security mode command message to UE according to the security mode command message forwarded by $LIPA_H$ |
| 519 | UE sends security mode complete message to $LIPA_V$ |
| 521 | $LIPA_V$ sends a security mode complete message to $LIPA_H$ according to the security mode complete message from UE |
| 523 | $LIPA_H$ forwards security mode complete message sent by $LIPA_V$ to CN |

FIG. 5B

| 502 | UE sends a request to LIPA$_V$ for requesting establishing a connection to LIPA$_H$ |
|---|---|
| 506 | CN trusts LIPA$_H$, so accepts the security function request sent by LIPA$_H$, and accordingly sends user authentication request to LIPA$_H$ |
| 507 | LIPA$_H$ forwards the user authentication request to LIPA$_V$ |
| 704 | LIPA$_V$ sends a RAU request to LIPA$_H$ to trigger an authentication procedure from UE to CN with both LIPA$_V$ and LIPA$_H$ being involved |
| 705 | LIPA$_H$ forwards the RAU request to CN to trigger CN to authenticate the UE |
| 706 | verify the temporary UE ID, the valid location of the temporary UE ID, and the verification code of the temporary UE ID |
| 508 | LIPA$_V$ sends user authentication request to the UE |
| 510 | UE sends user authentication response to LIPA$_V$ according to the verify result |
| 511 | LIPA$_V$ sends the verify result to LIPA$_H$ |
| 512 | LIPA$_H$ sends the user authentication response message to CN |
| 514 | CN sends security mode command to LIPA$_H$ |
| 516 | LIPA$_H$ forwards security mode command to LIPA$_V$ |
| 518 | LIPA$_V$ sends a security mode command message to UE according to the security mode command message forwarded by LIPA$_H$ |
| 519 | UE sends security mode complete message to LIPA$_V$ |
| 521 | LIPA$_V$ sends a security mode complete message to LIPA$_H$ according to the security mode complete message from UE |
| 523 | LIPA$_H$ forwards security mode complete message sent by LIPA$_V$ to CN |
| 725 | CN sends a RAU response to LIPA$_H$, the RAU response message contains the updated UE ID, the valid location information of the updated ID, and the verification code for determining the legitimacy and the authenticity of the updated ID |
| 726 | LIPA$_H$ forwards the RAU response to LIPA$_V$ |

FIG. 7B

| 502 | UE sends a request to $LIPA_V$ for requesting establishing a connection to $LIPA_H$ |
|---|---|
| 704 | $LIPA_V$ sends a RAU request to $LIPA_H$ to trigger an authentication procedure from UE to CN with both $LIPA_V$ and $LIPA_H$ being involved |
| 705 | $LIPA_H$ forwards the RAU request to CN to trigger CN to authenticate the UE |
| 907 | CN sends a SRNS context request to $LIPA_V$ |
| 908 | $LIPA_V$ sends a SRNS context response to CN |
| 909 | CN sends a SGSN context response to $LIPA_H$ |
| 726 | $LIPA_H$ forwards the RAU response to $LIPA_V$ |

FIG. 9B

AUTHENTICATION METHOD AND APPARATUS FOR USER EQUIPMENT AND LIPA NETWORK ENTITIES

CROSS-REFERENCE TO RELATED APPLICATION

The present application is based on, and claims priority from, Taiwan Application No. 100136290, filed Oct. 6, 2011, the disclosure of which is hereby incorporated by reference herein in its entirety.

TECHNICAL FIELD

The present disclosure generally relates to an authentication method and apparatus for Local Internet Protocol Access (LIPA) network entities and User Equipment (UE).

BACKGROUND

Home Node B (HNB) and/or Home eNodeB (HeNB) are apparatus of cellular access points that connect to the mobile operator's core network (CN) by broadband Internet connection. HNB and HeNB are abbreviated as H(e)NB thereinafter. Local Internet Protocol Access (LIPA) is the apparatus of telecommunications service which utilizes the features of H(e)NB and allows mobile user equipments (UEs) to connect to and to access data in the local home IP network of the UE without traversing through CN. LIPA may utilize mobile user equipments (UEs) such as mobile devices and mobile phones, through the LIPA and home IP devices, such as personal computers, printers, TVs, multimedia servers, etc., to communicate with applications for obtaining application services such as file relocation, device sharing, video streaming, and remote control, etc., For telecom operators, LIPA presents the opportunities for creating new services and generating additional profits, without consuming transmission resources of the core network. LIPA also benefits users in high-speed transmission without being limited by the transmission resources of the core network.

There are many related literatures and technologies for cross-network authentication. For example, a literature for cross-network authentication discloses the use of third-party secure management network (SMN) to perform security management among different networks. Network and network entity (NE) first perform registration to SMN and establish security association; if no security associated with the SMN, a gateway that security associated with SMN is required to intercommunicate with the NE and the SMN.

In another revealed literature, in cross-network authentication, the visiting network and the home network must establish trust relationships before providing cross-network communication services to UE. The functions in the cross-network authentication procedure disclosed by this referenced literature include the UE requests authentication to the visiting network, the visiting network requests the home network to authenticate the UE, the home network requests authentication to a central server with information of visiting network and transmits back the authentication results to the visiting network, and the UE determines whether to trust the dynamic host configuration protocol (DHCP) address provided by the visiting network according to the information provided by the home network.

Another literature discloses that in the process of cross-network connections, access, authorization, and accounting (AAA) proxy servers may use the key generated by the AAA server to generate multiple keys for different networks. Each AAA proxy server is responsible for the storage and the mapping of the corresponding temporary UE ID and keys, as well as the mapping of keys and the corresponding networks, to enhance the efficiency of authentication during handover. Besides, the UE may avoid transmitting permanent ID across the network.

Yet another literature discloses that a plurality of network nodes obtain and keep the authentication information of each other as common security information before providing cross-network communications services. Based on the common security information the plurality of network nodes may obtain a list of mutual trust alliance and the authentication information of the mutual trust alliance by one or more third-party authentication centers. Another revealed literature discloses that a plurality of applications perform authentication to the server through a same gateway (GW), the GW wherein retrieves the authentication information of all applications from an authentication center in one time. The GW is able to authenticate every individual application which the authentication information is kept in the GW, and every application may perform network transmission through the GW.

FIG. 1 illustrates an existing Third Generation Partnership Procedure (3GPP) compatible network architecture apparatus which involves H(e)NB in the access networks. Wherein Local Gateway (LGW) is a logical functional unit of H(e)NB. With a part of the functions of the Gateway General Packet Radio Service (GPRS) Support Node (GPRS Support Node is abbreviated as GGSN thereinafter), LGW is responsible for transmitting the information received from the UE to home devices through the IP network, as well as transmitting the information received from the home device to the UE through the telecommunications network. There is a user plane connection between LGW and H(e)NB, and the interface between LGW and the serving GPRS Support Node is Gn/S5 interface. Serving GPRS Support Node is abbreviated as SGSN thereinafter.

A LGW and an H(e)NB may be composed as a logical network entity that is referred as a LIPA network entity thereinafter. The method and the apparatus of forming a LIPA network entity includes implementing LGW and H(e)NB as an individual network entity, or associating LGW and H(e)NB as a logical network entity by way of security association. In FIG. 1, the network access architecture of H(e)NB defined by 3GPP does not support functions for global mobile access. In other words, UE may only access its home network under the service coverage of its home H(e)NB (HHNB). Any one of other H(e)NBs, naming a visiting H(e)NB, is abbreviated as VHNB thereinafter.

In order to enable the accessibility for UE to access the HHNB when the UE is served by a VHNB and/or by macro-cell without modifying the network entities and control messages of CN, another implementation of LIPA network is shown in FIG. 2. FIG. 2 illustrates an exemplary access network architecture with modified H(e)NB. In FIG. 2, LGW not only equipped with a portion of GGSN functionality but additionally also has a part of SGSN functionality. Accordingly a control plane interface is needed between HNB and LGW, and Gn/S5 interface is required between different LGW. Also in this architecture, all control messages will go through LGW. An LGW will act as a SGSN or GGSN when the LGW is capable of handling a received control message; otherwise, the LGW routes the received control message to CN. Consequently, Iuh interface and Gn/S5 interface are needed in between of LGW and CN. When a LGW is not capable to handle the control message received from HNB via the Iuh interface, the LGW routes the received control message to CN through the Iuh interface between the LGW and CN; when a LGW is not capable to handle the control message received from other LGW via the Gn/S5 interface, the LGW routes the received control message to CN through the Gn/S5 interface.

Every LIPA network entity accomplishes the authentication procedure to CN to achieve a mutual trust relationship of the LIPA network entity and CN before the LIPA network entity joining a network to provide communication service. When a UE enters a LIPA network service area, it is authenticated to CN via the LIPA entity of the LIPA network, to obtain the services provided by the LIPA network and the LIPA network entity. The UE attach procedure shown in FIG. 3 illustrates the procedure that a UE successfully authenticates to CN, e.g., SGSN and/or Home Location Register (HLR), through a LIPA network.

In the above mentioned network architecture and other existing 3GPP architecture, it is needed to ensure the mutual trust relationship among the UE, CN, the visiting LIPA network entity, and the home LIPA network entity, and to verify that the UE is authorized to access the home LIPA network before initiating LIPA service.

SUMMARY

The exemplary embodiments of the present disclosure may provide an authentication method and apparatus for Local Internet Protocol Access (LIPA) network entity and User Equipment (UE).

According to one exemplary embodiment, there is provided an authentication method for LIPA network entity and UE, the authentication method is applied to cross-LIPA communication situations. The cross-LIPA communication situations involve a UE, a visiting LIPA network entity ($LIPA_V$), and a home LIPA network entity ($LIPA_H$). The authentication method comprises: the UE successfully registers to a CN via the $LIPA_V$, to achieve mutual trust relationship between the UE and the $LIPA_V$; the UE successfully registers to the CN via the $LIPA_H$, to achieve mutual trust relationship between the UE and the $LIPA_H$; and the $LIPA_H$ successfully re-authenticates the UE via the $LIPA_V$, to achieve mutual trust relationship between the $LIPA_V$ and the $LIPA_H$.

According to another exemplary embodiment, there is provided an authentication apparatus for LIPA network entity and UE, the authentication apparatus is applied to cross-LIPA communication situations. The cross-LIPA communication situations involve a UE, a visiting LIPA network entity ($LIPA_V$), and a home network entity ($LIPA_H$). The authentication apparatus comprises a state machine, the state machine performs functions of the following sub-state machines: a first sub-state machine being used as an authentication and communication protocol mechanism between the UE and the $LIPA_V$, and the UE successfully registers to the CN via the $LIPA_V$, to achieve mutual trust relationship between the UE and the $LIPA_V$; a second sub-state machine being used as an authentication and communication protocol mechanism between the UE and the $LIPA_H$, and the UE successfully registers to the CN via the $LIPA_H$, to achieve mutual trust relationship between the UE and the $LIPA_H$; and a third sub-state machine being used as an authentication and communication protocol mechanism between the LIPA network entities, and the $LIPA_H$ successfully re-authenticates the UE via the $LIPA_V$, to achieve mutual trust relationship between the $LIPA_V$ and the $LIPA_H$.

The foregoing and other features, aspects and advantages of the exemplary embodiments will become better understood from a careful reading of a detailed description provided herein below with appropriate reference to the accompanying drawings.

BRIEF DESCRIPTION OF THE DRAWINGS

FIG. 5A and FIG. 5B illustrate the detailed operations of an authentication procedure triggered by the UE, according to an exemplary embodiment.

FIG. 7A and FIG. 7B illustrate detailed operations of an authentication procedure triggered by a simplified RAU procedure, according to an exemplary embodiment.

FIG. 9A and FIG. 9B illustrate detailed operations of an authentication procedure triggered by a RAU in addition with serving radio network subsystem (SRNS) relocation, according to an exemplary embodiment.

DETAILED DESCRIPTION OF DISCLOSED EMBODIMENTS

Figure 1:
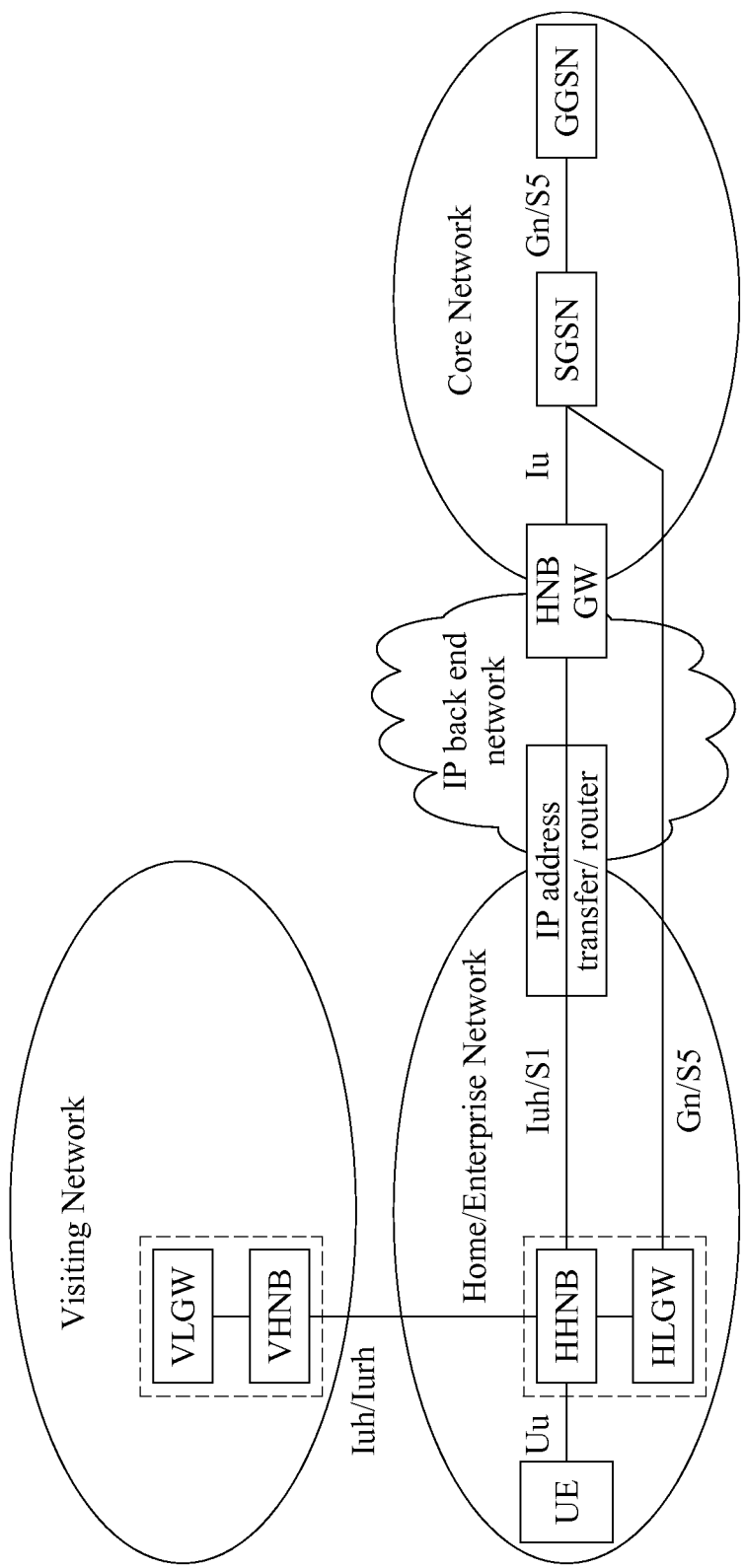
FIG. 1 is a schematic diagram of an existing H(e)NB access network architecture.
Figure 2:
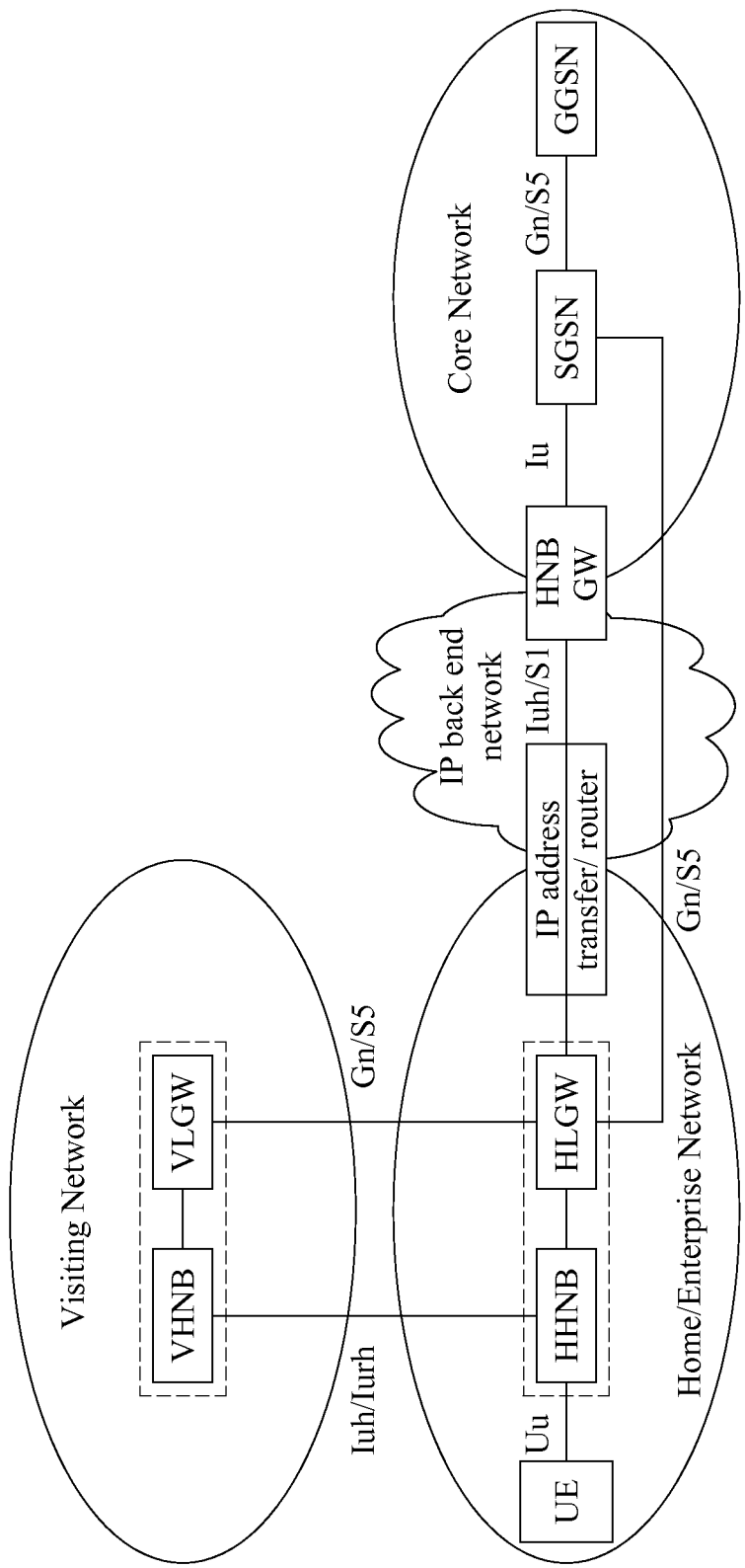
FIG. 2 is a schematic diagram of another access network architecture with modified H(e)NB.
Figure 3:
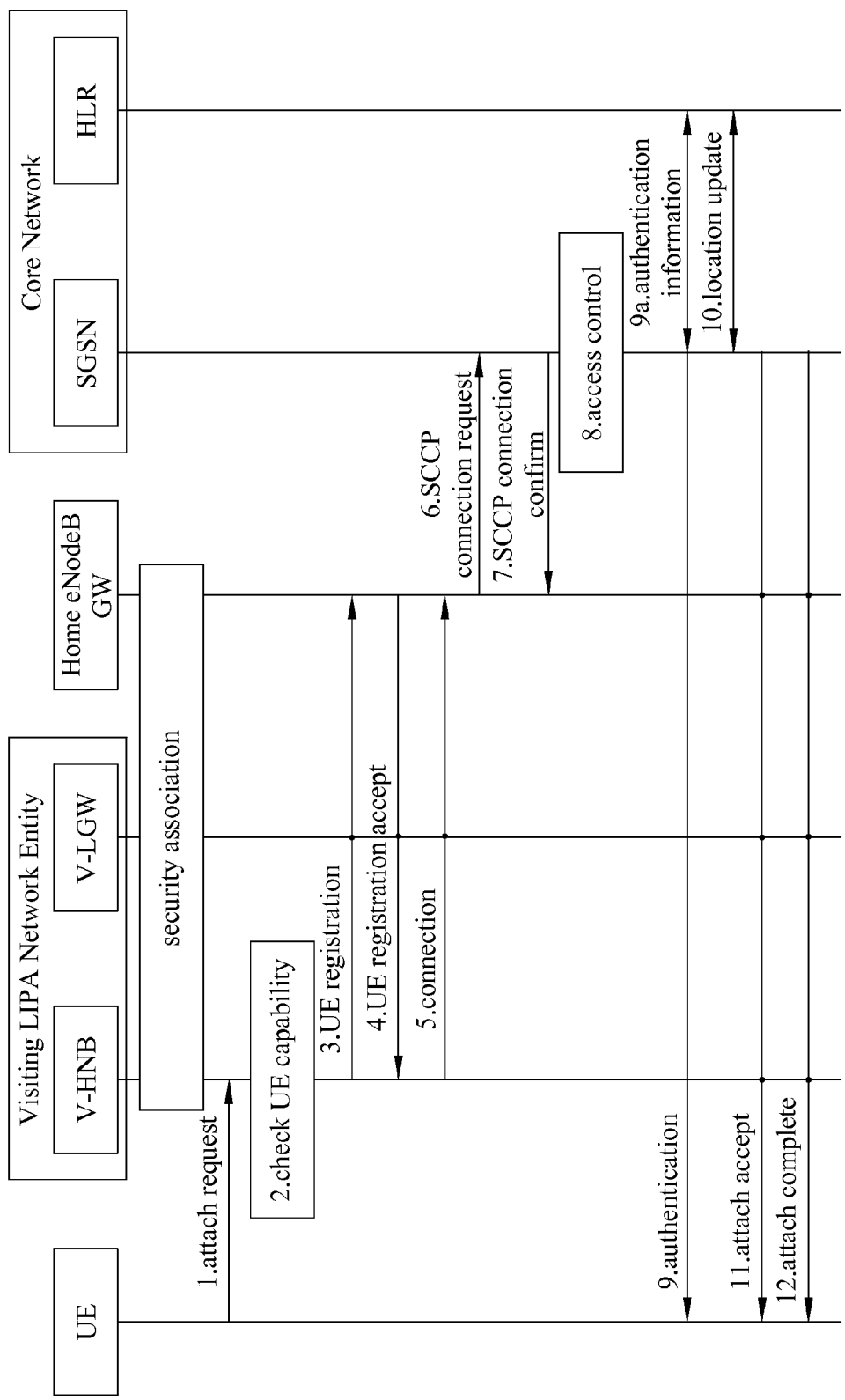
FIG. 3 is a schematic diagram illustrating the procedure of UE attachment.

In the exemplary embodiments, the disclosed systems and method provide a global authentication mechanism compatible to the existing 3GPP architecture. This mechanism combines access control of H(e)NB to the UE and authentication method of the UE to the core network, without changing the existing 3GPP UE, the core network entity, and security mechanism, so that when the UE moves to the visiting HNB, the UE may perform one-time authentication via a visiting LIPA network to the core network and home LIPA network, to achieve mutual trust relationship of the UE and the core network, mutual trust relationship of the visiting LIPA and the home LIPA, and determine access right of the UE to the home LIPA network.

Therefore, authentication request required for this one-time authentication at least includes that the core network must determine whether the UE which sends a request for connection is a legal UE, determine the access right of the requesting UE to the home LIPA network entity, also the home LIPA network entity needs to trust the UE as a legal UE to allow the access of the UE to the home LIPA network, and the visiting LIPA network entity and the home LIPA network entity need trust each other to exchange messages that contain UE private information. In other words, this one-time authentication includes the procedure of authentication between the UE and the home LIPA network entity, and the procedure of authentication between the visiting LIPA network entity and the home LIPA network entity.

The establishment of the trust relationship between UE and the core network may utilize existing Authentication and Key Agreement (AKA) mechanism. The implementation method for enabling the access right of UE to the home LIPA network entity may include performing access control by transmitting closed user subscriber group identity (CSG ID) of the home HNB (or home LGW) to the core network at the back end. The closed subscriber group identity represents the identity of a group of specific users. The establishment of the trust relationship between the visiting LIPA network entity and the home LIPA network entity is a more complex part. A connection between the visiting LIPA network entity and the home LIPA network entity is established due to connection demand of the user, usually this connections is created dynamically only when the user accesses to the home LIPA network via the visiting LIPA network; while there is not direct security association between the home LIPA network entity and the visiting LIPA network entity that a connection is dynamically established to, nor key and authentication algorithm of each other to perform authentication of the home LIPA network entity and the visiting LIPA network entity directly.

In applications of the cross-LIPA communications situations, one of the prerequisites is the cross-LIPA communication services may only be provided after both the visiting LIPA network entity and the home LIPA network entity have already been authenticated by the CN. The cross-LIPA communication situations involve a UE end, a visiting LIPA network entity end, and a home LIPA network entity end. The UE end has one or more UEs, the visiting LIPA network entity end has one or more visiting LIPA network entities, and the home LIPA network entity end has one or more home LIPA network entities.

In the disclosed exemplary embodiments, the one-time authentication of the three-way-mutual-authentication among the UE, the visiting LIPA network entity, and the home LIPA network entity does not include the mutual authentication and the establishment of security association between H(e)NB and L-GW to form a LIPA network entity. In application of cross-LIPA communication situations, when the UE enters the service coverage of the visiting LIPA network, if the UE may successfully complete the authentication procedure to the CN via the visiting LIPA network entity, then not only may achieve mutual authentication between the CN and the UE, also the UE may verify the legality and authenticity of the visiting LIPA network entity, and thus may establish mutual trust relationship among the UE, the CN, and the visiting LIPA network entity. Similarly, if the UE successfully authenticates to the CN via the home LIPA network, then the mutual trust relationship among the UE, the CN, and the home LIPA network entity may be established.

In other words, in the disclosed exemplary embodiments, when the UE performs authentication to the CN, it may be via both the visiting LIPA network entity and the home LIPA network entity. When the UE completes the CN authentication process successfully via both the visiting and the home LIPA network entities, both the visiting LIPA network entity and the home LIPA network entity may verify and confirm that each other has successfully completed the authentication process to the CN, and thereby achieve trust relationship between the visiting LIPA network entity and the home LIPA network entity.

Figure 4:
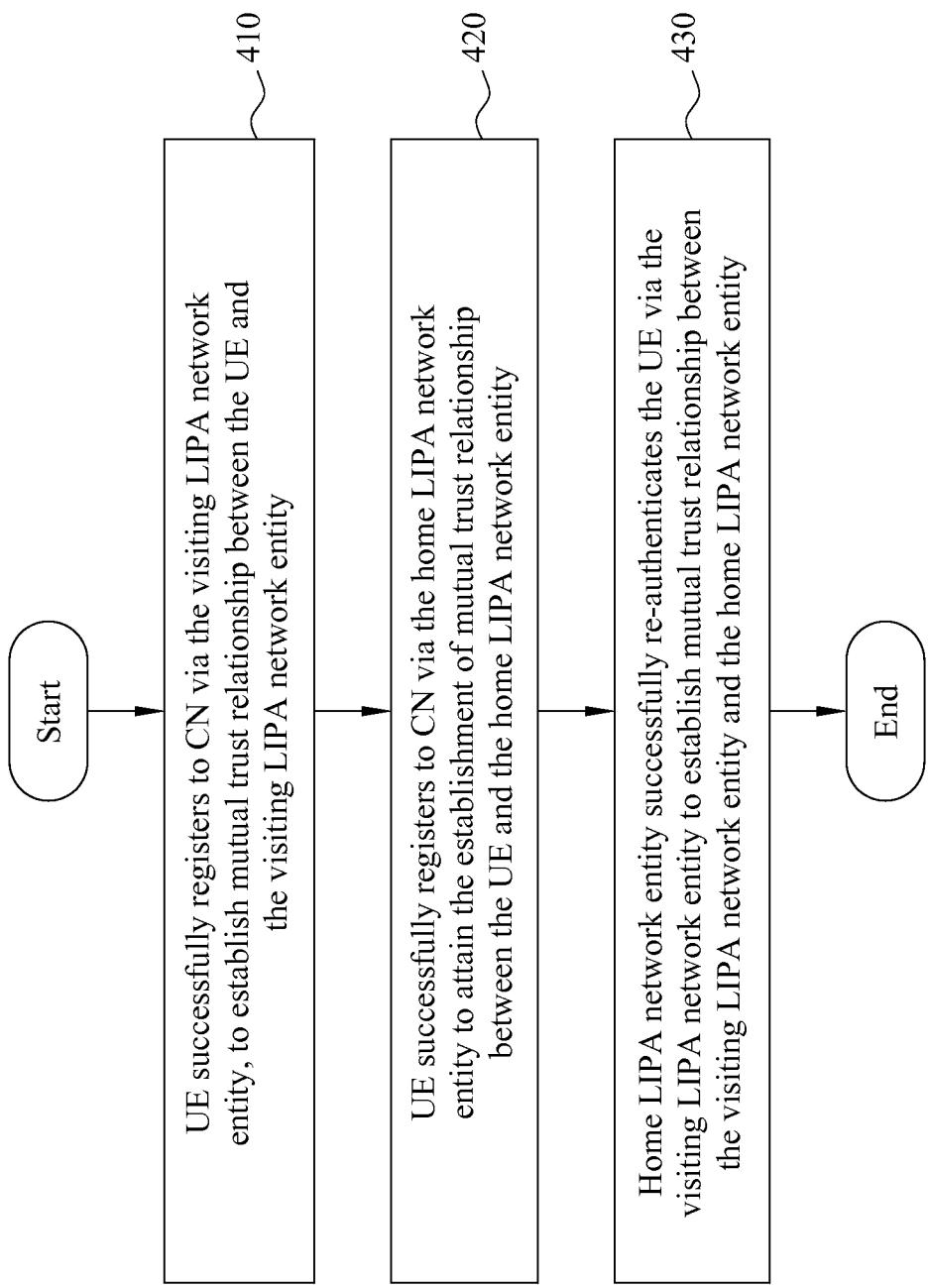
FIG. 4 is a schematic diagram illustrating a mutual authentication method among the UE, the visiting LIPA network entity, and the home LIPA network entity, according to an exemplary embodiment.

Therefore, according to the disclosed exemplary embodiments, the three-way-mutual-authentication among the UE, the visiting LIPA network entity, and the home LIPA network entity, may contain three parts as shown in the FIG. 4. In the first part 410, UE successfully registers to CN via the visiting LIPA network entity, to establish mutual trust relationship between the UE and the visiting LIPA network entity. In the second part 420, the UE successfully registers to CN via the home LIPA network entity to achieve the establishment of mutual trust relationship between the UE and the home LIPA network entity. In the third part 430, the home LIPA network entity successfully re-authenticates the UE via the visiting LIPA network entity to establish mutual trust relationship between the visiting LIPA network entity and the home LIPA network entity.

According to the three parts 410-430 of FIG. 4, the disclosed exemplary embodiments may provide several implementation ways for achieving the three-way-mutual-authentications among the UE, the visiting LIPA network entity, and the home LIPA network entity. For example, an authentication procedure triggered by user end, an authentication procedure triggered by a simplified routing area update(RAU) procedure, and an authentication procedure triggered by a RAU in addition with serving radio network subsystem (SRNS) relocation.

In a cross-LIPA communication situation, FIG. 5A and FIG. 5B, FIG. 7A and FIG. 7B, and FIG. 9A and FIG. 9B illustrate detailed operations for implementation of three exemplary embodiments, respectively. Wherein, every message with solid line represents the message of the existing 3GPP standards, every label on solid line indicates steps of current 3GPP standards; every message with dotted line represents the message of the exemplary embodiments of the present disclosure, every label on dotted line indicates steps of the exemplary embodiments of the present disclosure; the UE represents UE end, the $LIPA_V$ represents the visiting LIPA network entity end, the $LIPA_H$ represents the home LIPA network entity end.

In the authentication procedure triggered by user end, the visiting LIPA network entity issues a specific message, such as issues a security function request to the home LIPA network entity, the home LIPA network entity forwards the specific message to the CN, to trigger a complete UE authentication procedure. The UE and the CN in authentication procedure calculate the number for verifying each other based on one or more common shared secrets, and to achieve mutual trust relationship between the UE and the CN, and this procedure also enable mutual trust relationships among involved network entities.

Figure 5A:
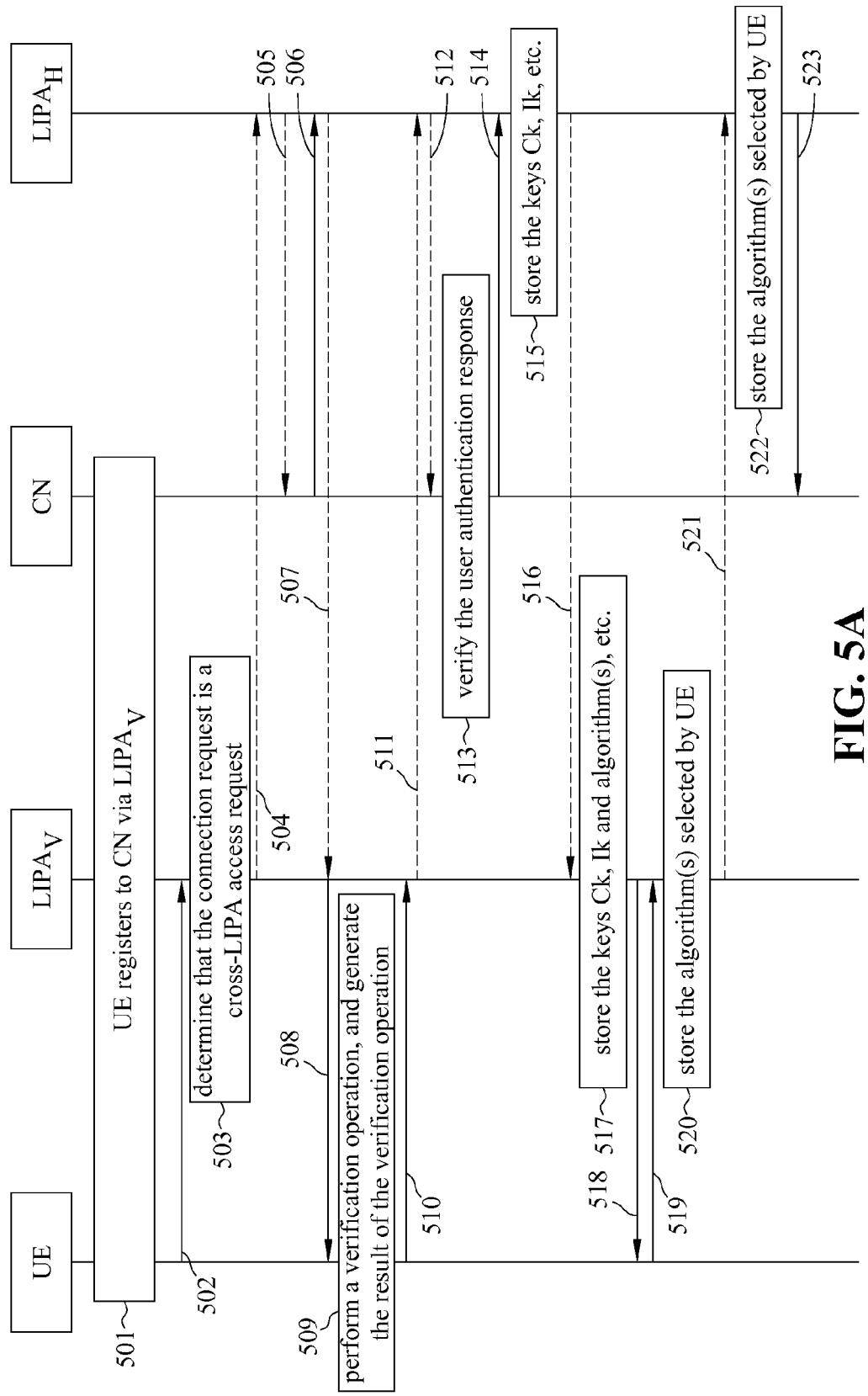

FIG. 5A and FIG. 5B illustrate detailed operations of an authentication procedure triggered by the user end, according to an exemplary embodiment. The operations of this authentication procedure are described as follows.

In step 501, the UE successfully registers to the CN via the $LIPA_V$. After the completion of the successful registration procedure, it implies the establishment of mutual trust relationships among the UE, the CN, and the $LIPA_V$. Meanwhile, security associations are established among the UE, the $LIPA_V$, and the CN by the procedure of key exchange or storage. In step 502, the UE sends a request to the $LIPA_V$ for requesting establishing a connection to $LIPA_H$. In step 503, the $LIPA_V$ determines that the connection request is a cross-LIPA request. After the access request for the cross-LIPA communication is determined then the authentication procedure is started.

In step 504, the $LIPA_V$ sends a specific message to the $LIPA_H$, such as sends a security function request to initiate the authentication process from UE to the CN via both the $LIPA_V$ and the $LIPA_V$. This specific message contains a UE ID which may be used to identify and distinguish an individual UE from other UE; at this moment the $LIPA_V$ does not trust the $LIPA_H$. In step 505, due to that $LIPA_H$ does not trust the $LIPA_V$, the $LIPA_H$ forwards the specific message to CN, and leave to CN to authenticate the UE. The CN accepts the specific message from $LIPA_H$ only when the CN has a trusting relationship with $LIPA_H$. Step 505 implies that the CN and the $LIPA_H$ have mutual trust relationship.

In step 506, the CN trusts the $LIPA_H$, so accepts the security function request sent by $LIPA_H$, and accordingly sends a user authentication request to the $LIPA_H$, to request $LIPA_H$ to authenticate the UE. The information included in the authentication process includes one or more algorithms used for authentication, the data such as RAND, and the random sequence of number used for the mutual verification between CN and the UE, for example, the authentication code AUTN.

In step 507, the $LIPA_H$ forwards the user authentication request, i.e., the message from CN to request UE to perform authentication to the CN, to the $LIPA_V$. In step 508, after the $LIPA_V$ receives the message forwarded from $LIPA_H$ to request UE for authentication, The $LIPA_V$ sends a user authentication request to the UE. The authentication request message contains the algorithm used for authentication and the random sequence for mutual verification used between the CN and the UE.

In step 509, the UE performs a verify operation and calculates a verification result. Because the UE stores the common shared secret of the CN and the UE, the UE performs verify operation according to the message content parameters (such as AUTN) in step 508 and the common secret stored in the UE (this verify operation may be implemented by chips or software), and calculates the verification result. In step 510, the UE sends a user authentication response to the $LIPA_V$ according to the verification result of the user authentication response.

In step 511, the $LIPA_V$ sends the verification result responded by the UE, i.e., the user authentication response message, to the $LIPA_H$. In step 512, the $LIPA_H$ sends the user authentication response message to the CN for verification. In step 513, the CN verifies the user authentication response, wherein the CN may authenticate the UE by using the common secret of the UE and the CN, and the random sequence for authentication calculation. Then the CN compares the calculation result generated by itself with the verification result generated by the UE to verify the authentication result and so as to authenticate the UE. When the CN successfully authenticates the UE, it implies the CN trusts the UE, then executes step 514; when the CN fails to authenticate the UE, the CN sends out a reject message.

In step 514, the CN sends a security mode command to the $LIPA_H$ for transmitting keys to the UE. In step 514, $LIPA_H$ may verify the legality and authenticity of the UE by receiving from CN the security mode command which contains the keys transmitted from the CN, such as Ck, Ik, and algorithm(s) alg, etc. Also because in the step 510, the UE sends message of verification result to the $LIPA_V$ only when the UE trusts the LIPAv, therefore achieve the conclusion that the $LIPA_V$ may trust the $LIPA_H$. The step 514 reaches the conclusions that the CN trusts the $LIPA_H$, and the $LIPA_H$ trusts the UE and the $LIPA_V$. In step 515, the $LIPA_H$ stores the information issued by the CN, such as keys Ck, Ik, etc., as the basis for the following communications with the UE.

In step 516, the $LIPA_H$ forwards the security mode command to the $LIPA_V$, the security mode command contains the information issued by the CN, such as the keys Ck, Ik, and algorithm(s) alg, etc. In step 517, the $LIPA_V$ stores the keys Ck, Ik, and algorithm(s) alg, etc. that are issued by the CN, as the basis for the following communications with the UE. In step 518, the $LIPA_V$ sends a radio access network based security mode command message to the UE according to the security mode command message forwarded from $LIPA_H$, the radio access network based security mode command message contains information of the information issued by the CN, such as the keys and the algorithm(s) etc. The UE receives the radio access network based security mode command message and verifies the message parameters (e.g., MAC-I) to validate the trust relationship between the UE and the CN; also validate the trust relationship between the UE and $LIPA_H$ because the CN trusts the $LIPA_H$. The step 518 reaches the conclusion that the UE may trust the CN and the $LIPA_H$.

In step 519, the UE sends a security mode complete message to the $LIPA_V$ to imply that the UE has already verified the legitimacy and authenticity of the CN, so $LIPA_V$ trusts that the previous authentication request is issued from the CN, then trusts that the $LIPA_H$ is trusted by the CN, therefore reaches the conclusion that the $LIPA_V$ may trust the $LIPA_H$. In step 520, the $LIPA_V$ stores the algorithm selected by the UE.

In step 521, the LIPAv sends the security mode complete message to the $LIPA_H$ according to the security mode complete message that the $LIPA_V$ received from the UE. In step 522, after the $LIPA_H$ receives the security mode complete message from the $LIPA_V$ and stores the algorithm selected by the UE, the $LIPA_H$ confirms that the UE trusts the $LIPA_H$. Step 522 completes mutual trust relationship among the UE, the $LIPA_H$, and the $LIPA_V$.

In step 523, the $LIPA_H$ forwards the security mode complete message sent from the $LIPA_V$ to the CN, this step confirms to CN that the UE has already verified the legitimacy and authenticity of the CN, and every LIPA network entity involved in the communication procedure of the UE and the CN has already established mutual trust relationship. In other words, step 523 completes mutual trust relationship among the UE, the $LIPA_H$, the $LIPA_V$, and the CN.

Therefore, according to the exemplary embodiment of FIG. 5A and FIG. 5B, step 504 to step 505 represent the messages for triggering a re-authentication process. In the operation of step 506 to step 513, except the $LIPA_H$ relay function, represent a normal Universal Mobile Telecommunications System (UMTS) AKA procedure, wherein the step 507 represents that the $LIPA_H$ forwards the user authentication request message to $LIPA_V$. In step 511 and step 512, the $LIPA_V$ and the $LIPA_H$ forward the user authentication response message, respectively. In the operation of step 514 to step 523, except the forward function of the $LIPA_H$ and the $LIPA_V$, is a normal security mode control procedure, wherein step 516 represents that the $LIPA_H$ forwards the security mode command message to $LIPA_V$, and step 521 represents that the $LIPA_V$ forwards the security mode complete message to $LIPA_H$.

Figure 6:
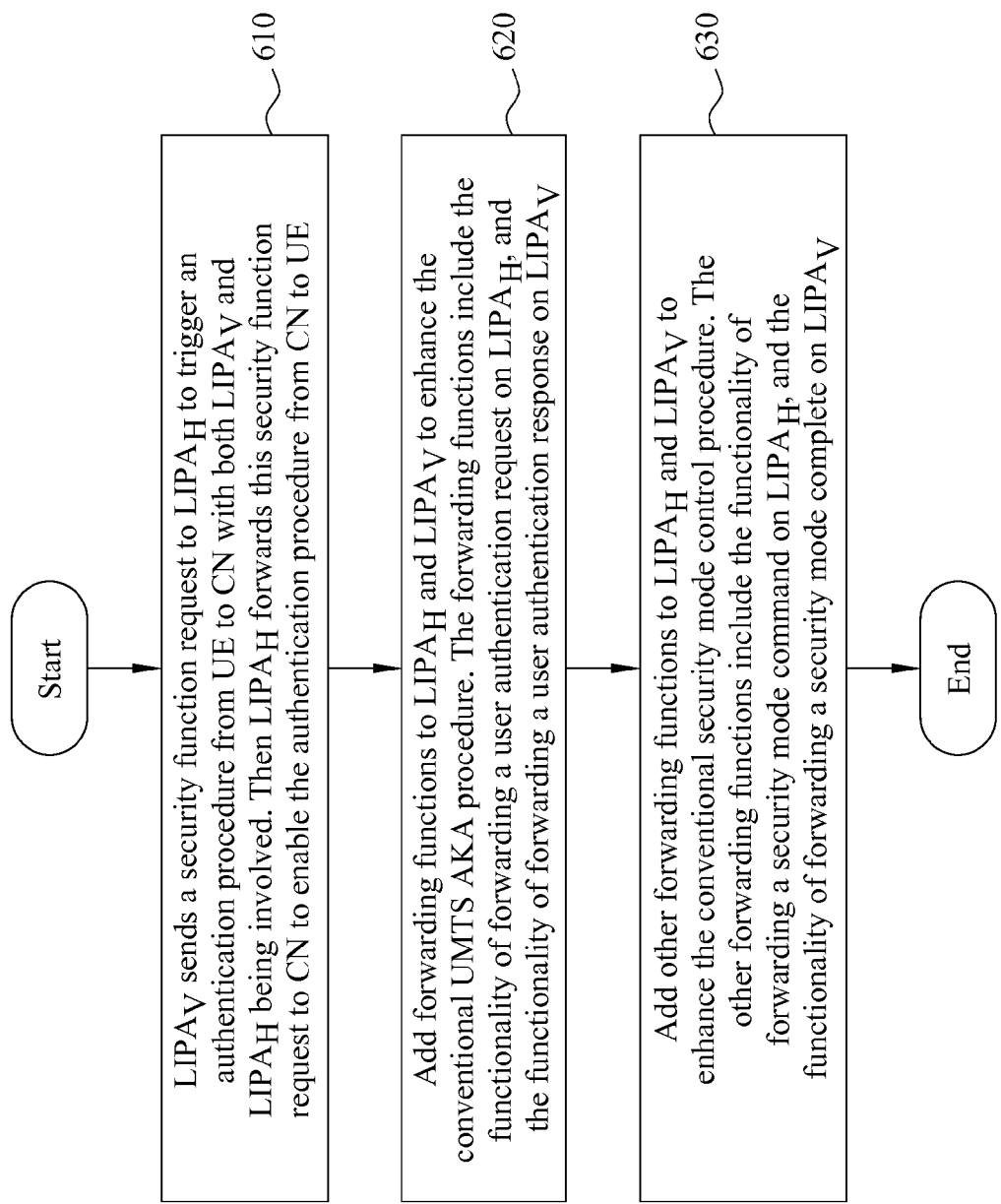
FIG. 6 illustrates a flowchart of the authentication procedure in FIG. 5A and FIG. 5B, according to an exemplary embodiment.

In other words, from the disclosed exemplary embodiment of FIG. 5A and FIG. 5B, FIG. 6 is a flowchart illustrating an authentication procedure triggered by user end, according to an exemplary embodiment. In step 610, the $LIPA_V$ sends a specific message, such as a security function request, to the $LIPA_H$ to trigger an authentication procedure from UE to CN with both $LIPA_V$ and $LIPA_H$ being involved. Then the $LIPA_H$ forwards this specific message (security function request) to the CN to enable the authentication procedure from CN to UE. In step 620, in an existing UMTS AKA procedure, add forwarding functions to $LIPA_H$ and $LIPA_V$ to enhance the conventional UMTS AKA procedure. The so called forwarding functions may include the functionality of forwarding a user authentication request on LIPA$_H$, and the functionality of forwarding a user authentication response on LIPA$_V$. In step 630, in an existing security mode control procedure, it may add other forwarding functions to LIPA$_H$ and LIPA$_V$ to enhance the conventional security mode control procedure. The so called other forwarding functions may include the functionality of forwarding a security mode command on LIPA$_H$, and the functionality of forwarding a security mode complete on LIPA$_V$.

In the authentication procedure triggered by simplified RAU procedure, after the UE successfully completes the authentication procedure to the CN via the LIPA$_V$, mutual trust relationship may be established among the UE, the CN, and the LIPA$_V$. At this moment the LIPA$_V$ sends RAU message to the LIPA$_H$, and the LIPA$_H$ forwards this RAU message to the CN, to trigger a complete authentication procedure of the UE. In the authentication procedure, the UE and the CN calculate the number for verifying each other based on a common shared secret, to achieve mutual trust relationship between the UE and the CN, and this procedure also enables the mutual trust relationships among all involved network entities.

Figure 7A:
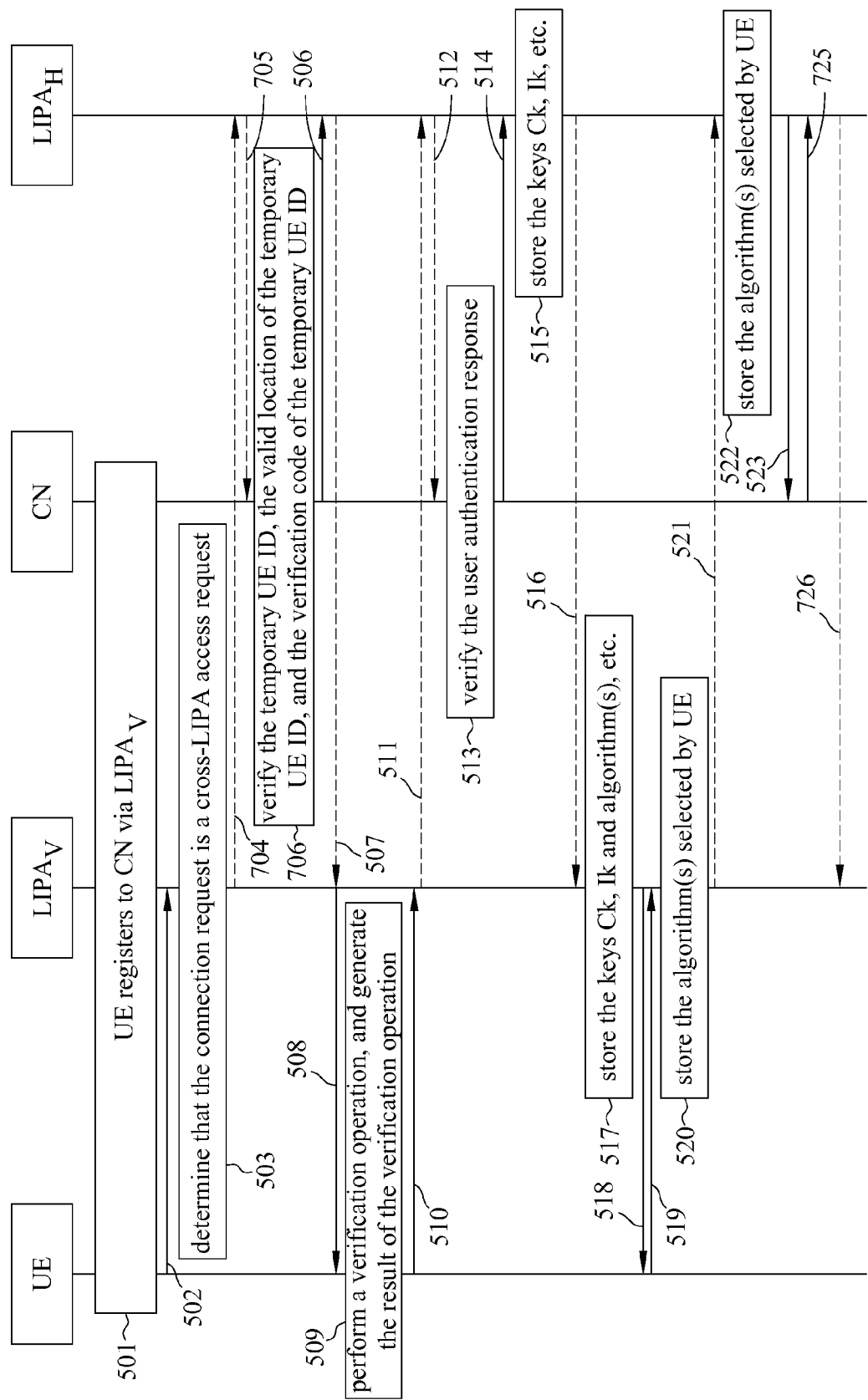

FIG. 7A and FIG. 7B illustrate detailed operations of an authentication procedure triggered by a simplified RAU procedure, according to an exemplary embodiment. The operations of FIG. 7A and FIG. 7B include steps 501 to 503, step 704 to step 706, step 506 to step 513, step 514 to step 523, and step 725 to step 726. Compared with the exemplary embodiment of FIG. 5A and FIG. 5B, the exemplary embodiment of FIG. 7A and FIG. 7B is based on the messages of steps 704-706 to trigger a re-authentication procedure, and steps 725-726 to complete the RAU procedure. The following describes steps 704-706 and steps 725-726, other steps are not repeated.

In the exemplary embodiment of FIG. 7A and FIG. 7B, when steps 501-503 are completed, and after the connection request is determined as a cross-LIPA access request, the authentication procedure starts. As shown in step 704 of FIG. 7A and FIG. 7B, the LIPAv sends a specific message, such as the RAU request, to the LIPA$_H$ to trigger an authentication procedure from UE to CN with both LIPA$_V$ and LIPA$_H$ being involved. At this moment the LIPA$_V$ does not trust the LIPA$_H$, will avoid transmitting private information of the UE in the RAU request message, so the RAU request message contains a temporary UE ID (such as a temporary P-TMSI), valid location information of this temporary ID (such as temporary RAI), and a verification code which may be utilized to determine the legitimacy and the authenticity of the temporary UE ID (for example, a temporary P-TMSI signature). In step 705, because the LIPA$_H$ does not trust the LIPA$_V$, so the LIPA$_H$ forwards the specific information in step 704, such as the RAU request, to the CN to trigger the CN to authenticate the UE. The CN accepts message from the LIPA$_H$ only when the CN trusts the LIPA$_H$, the step 705 implies that the CN and the LIPA$_H$ already have a trust relationship.

According to this specific message, such as the RAU request, in step 706, the CN verifies the temporary UE ID, the valid location of the temporary UE ID, and the verification code of the temporary UE ID. When the verification is completed successfully, steps 514 to 523 are executed; when the verification result is a fail, then the CN sends a reject message to the LIPA$_H$.

When steps 514 to 523 are completed successfully, it means that the process of security mode configuration has been completed, and mutual trust relationship among the UE, the LIPA$_H$, the LIPA$_V$, and the CN has been established. As shown in the step 725 of FIG. 7A, the CN sends a RAU response to the LIPA$_H$, the RAU response message contains an updated UE ID (such as an updated P-TMSI), valid location information of the updated ID (such as an updated RAI), and the verification code which may be utilized to determine the legitimacy and the authenticity of the updated ID (such as an updated P-TMSI signature). In step 726, the LIPA$_H$ forwards the RAU response message to the LIPA$_V$. Accordingly, step 725 and step 726 complete the RAU procedure.

After the successful completion of the RAU procedures, the UE may trust the LIPA$_H$, thus implies a pair wise mutual trust relationship among the UE, the LIPA$_V$, the LIPA$_H$, and the CN. The UE may be transferred to the service area of the LIPA$_H$, and may use the services provided by the LIPA$_H$.

Figure 8:
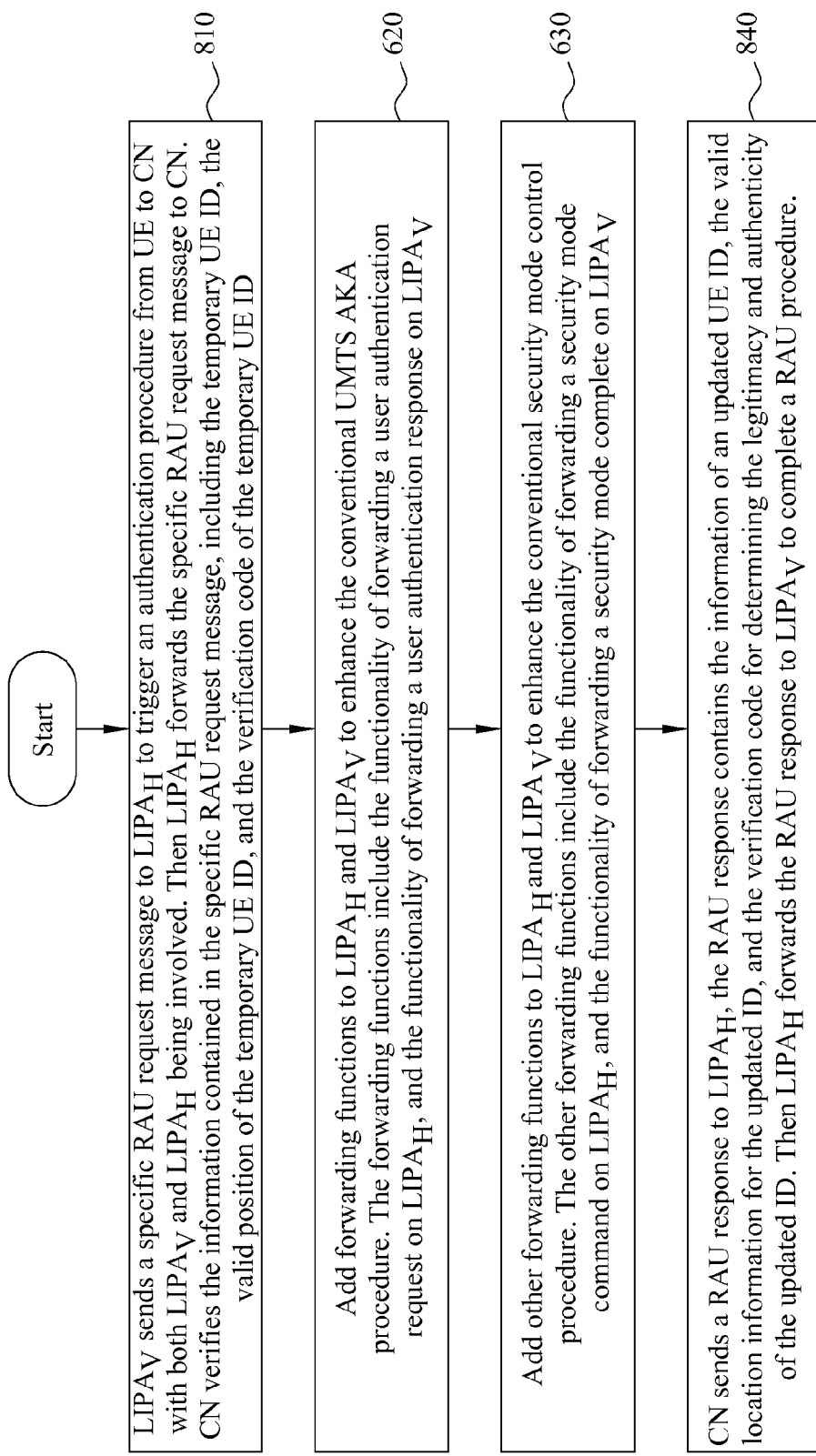
FIG. 8 illustrates a flowchart of the authentication procedure triggered by the simplified RAU procedure shown in FIG. 7A and FIG. 7B, according to an exemplary embodiment.

FIG. 8 illustrates a flowchart of the authentication procedure triggered by the simplified RAU procedure shown in FIG. 7A and FIG. 7B, according to an exemplary embodiment. This procedure sequentially contains step 810, step 620, steps 630 and step 840. In step 810, the LIPAv sends a specific message of RAU request to the LIPA$_H$ to trigger an authentication procedure from UE to CN with both LIPA$_V$ and LIPA$_H$ being involved. Then the LIPA$_H$ forwards the specific message to the CN, and the CN verifies the information contained in the specific message, including the temporary UE ID, the valid position of the temporary UE ID, and the verification code of the temporary UE ID. Steps 620 and 630 will not be repeated here. In step 840, the CN sends a RAU response to the LIPA$_H$, the RAU response contains the information of an updated UE ID, the valid location information for the updated ID, and the verification code for determining the legitimacy and authenticity of the updated ID; then the LIPA$_H$ forwards this RAU response message to the LIPA$_V$ to complete the RAU procedure.

In the authentication procedure triggered by RAU with SRNS relocation, mutual trust relationship may be established among the UE, the LIPA$_V$ and the CN when the UE successfully completes the registration procedure to CN via the LIPA$_V$. At this moment the LIPA$_V$ takes the LIPA$_H$ as the new SGSN/SRNC, and sends a RAU message to the LIPA$_H$ to trigger a complete RAU procedure. This may result in that the CN may identify the UE is under the service coverage of LIPA$_H$ and is served by the LIPA$_H$. In the authentication procedure triggered by RAU with SRNS relocation, mutual trust relationships exist between the CN and the LIPA$_V$, and the CN and the LIPA$_H$. When the UE performs authentication procedure to the LIPA$_H$ and to the CN on the premise that LIPA$_V$ and LIPA$_H$ have established mutual trust relationship, then mutual trust relationship may be established among the UE, the LIPA$_H$, and the CN.

Figure 9A:
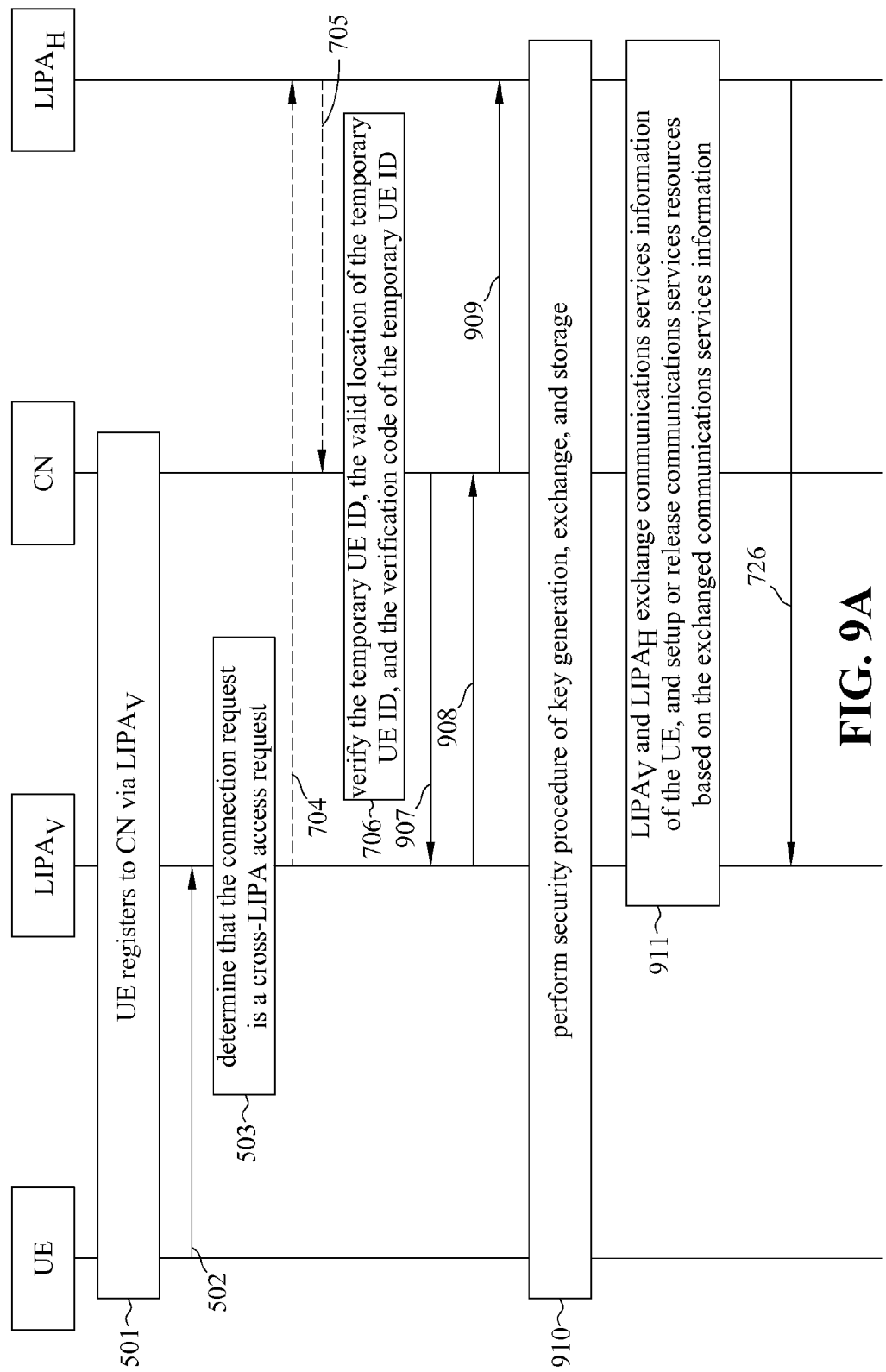

FIG. 9A and FIG. 9B illustrate detailed operations of an authentication procedure triggered by a RAU in addition with SRNS relocation, according to an exemplary embodiment. The operation of the exemplary embodiment includes steps 501-503, steps 704-706, steps 907-911, and step 726. Compared with the exemplary embodiment in FIG. 7A and FIG. 7B, the exemplary embodiment in FIG. 9A and FIG. 9B, after the completion of triggering the full RAU procedure, performing a SRNS relocation procedure by steps 907-909; performing a security procedure by step 910; exchanging communications services data of the UE between the LIPA$_V$ and the LIPA$_H$ by step 911; and completing the RAU procedure by step 726. Steps 907-911 are illustrated in the following, other steps will not be repeated here.

After the completion of step 706, as mentioned earlier, at this moment the CN has already verified the temporary UE ID, valid location of the temporary UE ID, and the verification code of the temporary ID, and the CN has established mutual trust relationship with UE. In step 907, the CN sends a request message to the $LIPA_V$, such as SRNS context request, to request from the $LIPA_V$ the communications services information of the UE that is kept in the $LIPA_V$; this message implies that there is mutual trust relationship between the CN and the $LIPA_V$. Step 907 also implies that the CN has already verified the $LIPA_H$, so the $LIPA_V$ may trust the $LIPA_H$.

In step 908, the $LIPA_V$ sends a SRNS context response message to the CN, to transmit the communications service data of the UE kept in the $LIPA_V$ to the CN. After the CN receives the communication service data of the UE from the $LIPA_V$, as shown in the step 909, the CN sends a message to the $LIPA_H$, such as SGSN context response, to request the $LIPA_H$ to prepare corresponding communications service resources. Step 909 also implies that the $LIPA_H$ may trust the UE. The SGSN context response message implies that the UE, the $LIPA_V$, and the $LIPA_H$ have already been trusted by the CN, so the $LIPA_V$ and the $LIPA_H$ may trust each other, also the $LIPA_H$ may trust the UE.

In step 910, the UE, the $LIPA_V$, the $LIPA_H$, and the CN perform a security procedure of key generation, exchange, and storage. After the successful completion of this security procedure, the $LIPA_V$ and the $LIPA_H$ exchange communications services data of the UE in step 911, and setup or release communications service resources according to the exchanged communications services data. After the successful completion of step 911, step 726 may be performed to complete the RAU procedure. The successful completion of the RAU procedure implies that the UE trusts the $LIPA_H$, so reaches mutual trust relationships among the UE, the $LIPA_V$, the $LIPA_H$, and the CN. Therefore, the UE may be transferred to the service area of the $LIPA_H$ and may use the services provided by the $LIPA_H$.

Figure 10:
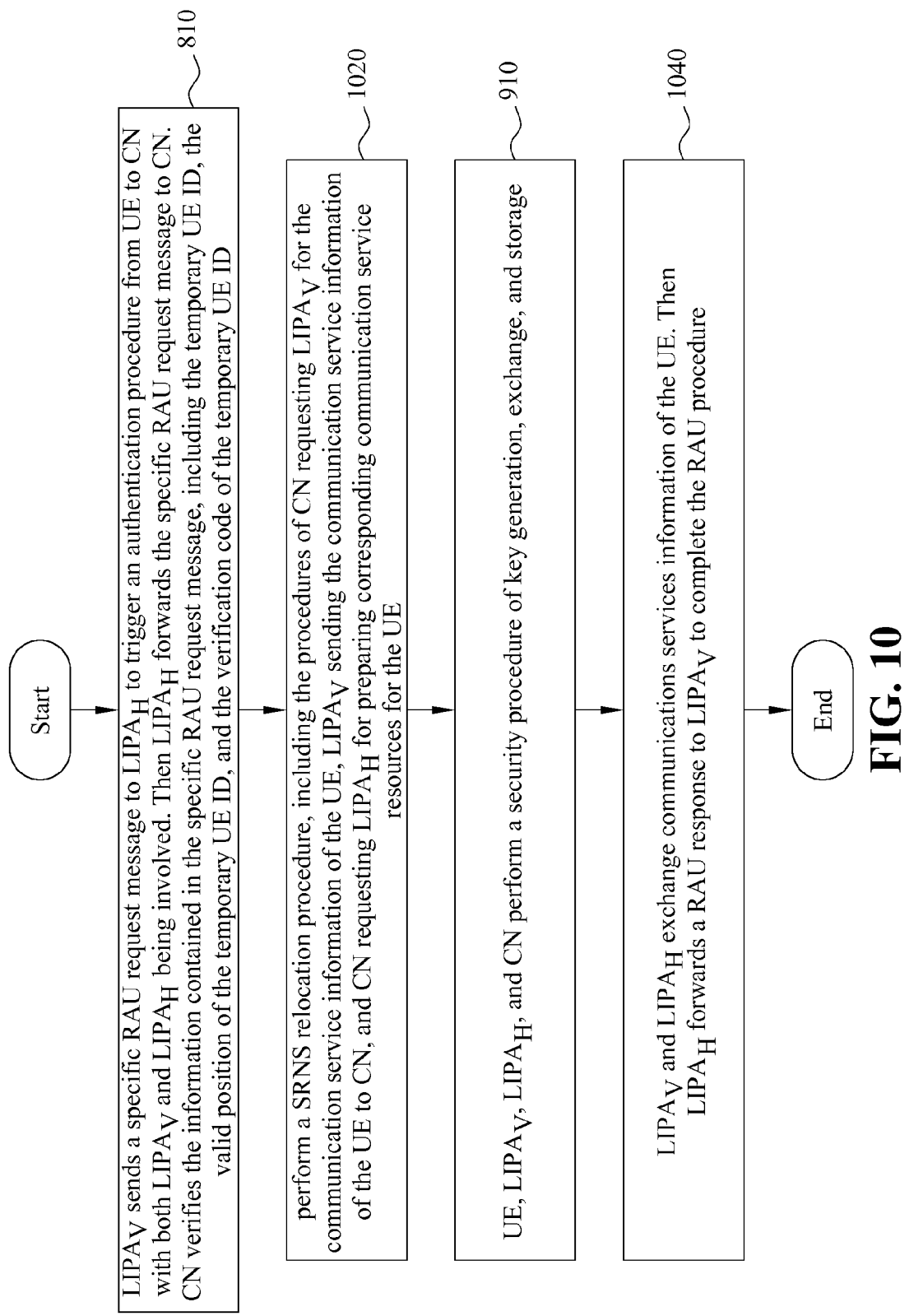
FIG. 10 illustrates a flowchart of the authentication procedure triggered by the RAU in addition with SRNS relocation shown in FIG. 9A and FIG. 9B, according to an exemplary embodiment.

FIG. 10 illustrates a flowchart of the authentication procedure triggered by the RAU in addition with SRNS relocation shown in FIG. 9A and FIG. 9B, according to an exemplary embodiment. This procedure sequentially includes step 810, step 1020, step 910, and step 1040. After step 810, in step 1020, the procedure performs a SRNS relocation procedure, including the functionalities that the CN requests from the $LIPA_V$ the communications service information of the UE kept in the $LIPA_V$, the $LIPA_V$ sending to the CN the communications service information of the UE kept in the $LIPA_V$, and the CN requesting the $LIPA_H$ to prepare corresponding communications service resources. Following the step 910, the functionalities in step 1040 include exchanging between the $LIPA_V$ and the $LIPA_H$ the communications service information of the UE, and then the $LIPA_H$ forwards RAU response message to the $LIPA_V$ to complete the RAU procedure.

Figure 11:
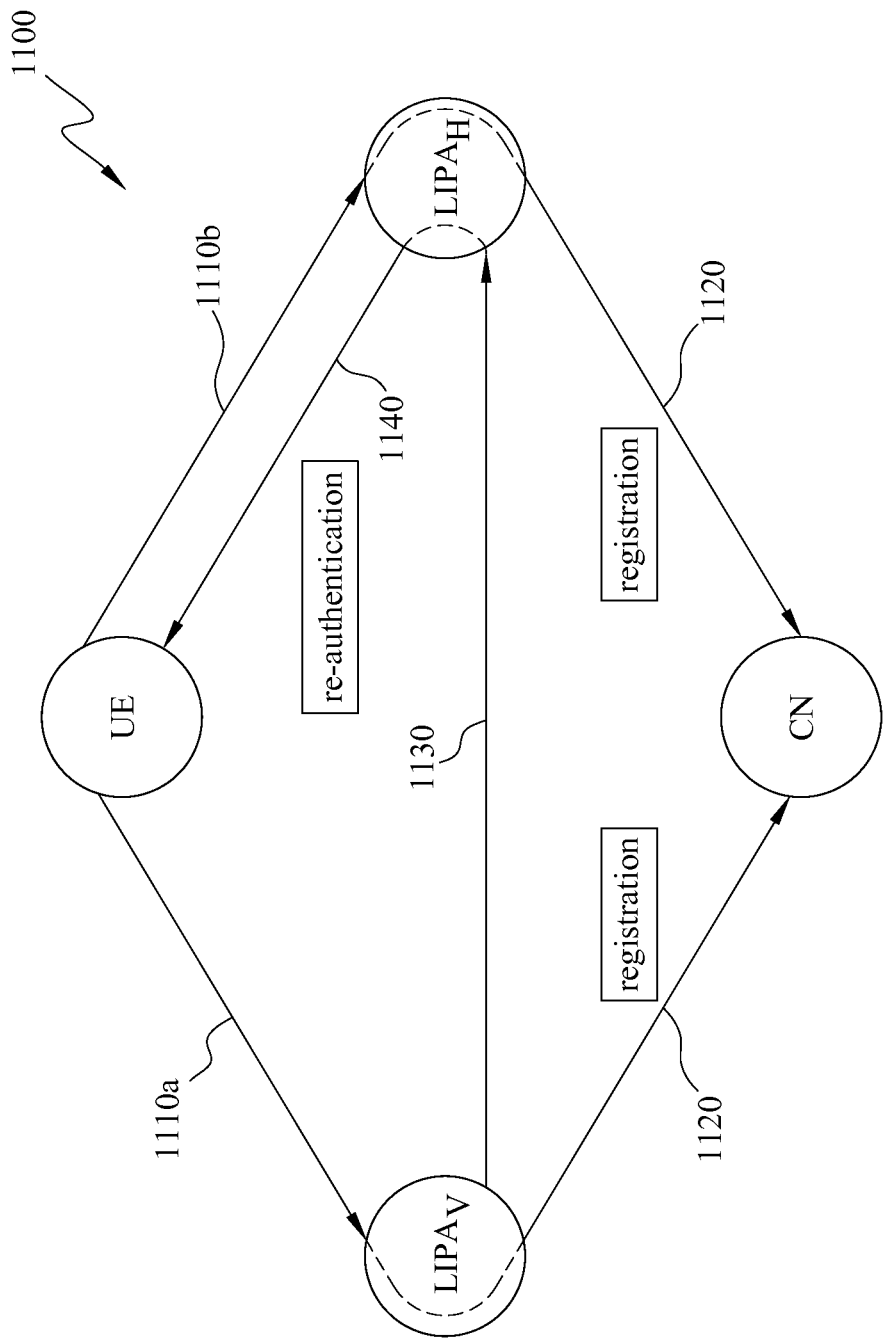
FIG. 11 is a schematic diagram illustrating a state machine of an authentication apparatus for the authentication between LIPA network entity and the UE, according to an exemplary embodiment.

In the applications of the cross-LIPA communications situation as depicted above, FIG. 11 is a schematic diagram illustrating a state machine of an authentication apparatus for the LIPA network entities and the UE, according to an exemplary embodiment. Referring to FIG. 11, the authentication apparatus comprises a state machine 1100, and the state machine 1100 further includes the following sub-state machines. A first sub-state machine is configured to represent an authentication and protocol mechanism between the UE end and the $LIPA_V$, wherein the UE successfully registers to the CN (as shown in label 1120) via the $LIPA_V$ (shown as arrows 1110a) to attain mutual trust relationship between the UE and the $LIPA_V$; a second sub-state machine is configured to represent an authentication and protocol mechanism between the UE and the $LIPA_H$, wherein the UE successfully registers to the CN (as shown in label 1120) via the $LIPA_H$ (shown as arrows 1110b) to attain mutual trust relationship between the UE and the $LIPA_H$; and a third sub-state machine is configured to represent a re-authentication and protocol mechanism between LIPA network entities, wherein the $LIPA_H$ successfully requests and re-authenticates (as shown in label 1140) the UE with $LIPA_V$ being involved (shown as arrow 1130) to attain mutual trust relationship between the $LIPA_V$ and the $LIPA_H$.

In other words, the state machine 1100 may execute three-way-mutual authentication among the UE, the $LIPA_V$, and the $LIPA_H$, and perform one-time authentication to the CN and the $LIPA_H$ via the $LIPA_V$, to attain mutual trust relationship between the UE and the CN, the mutual trust relationship between the $LIPA_V$ and the $LIPA_H$, and to determine the access right of the UE to access the $LIPA_H$. And, according to the detailed operations of above mentioned FIG. 5A and FIG. 5B, FIG. 7A and FIG. 7B, and FIG. 9A and FIG. 9B, the third sub-state machine may be triggered to request the UE for re-authentication by a user authentication request message, or by a RAU request message, or by a RAU request message with an SRNS relocation procedure. When the third sub-state machine performs a RAU procedure, also includes the procedure that the $LIPA_H$ forwards a RAU response message to the $LIPA_V$, to complete this RAU procedure. When the third sub-state machine performs SRNS relocation procedure, the SRNS relocation procedure includes the functionalities that the CN requesting from the $LIPA_V$ the communication service information of the UE kept in the $LIPA_V$, the $LIPA_V$ transmitting to the CN the communication service information of the UE kept in the $LIPA_V$, and the CN requesting the $LIPA_H$ to prepare corresponding communications service resources.

Bearing the above, the disclosed exemplary embodiments provide a global authentication method and apparatus compatible to the existing 3GPP architecture. This authentication technique combines the access control method of the H(e)NB to the UE and the authentication method of the UE to the core network, without changing the existing 3GPP UE, the core network entity, and the security mechanism, so that when the UE moves to the service area of a visiting HNB, the UE may perform one-time authentication to the core network and the home LIPA network via the visiting LIPA network, so as to attain mutual trust relationship between the UE and the core network, mutual trust relationship between the visiting LIPA network and the home LIPA network, and determine the network access right of the UE to the home LIPA network.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An authentication method for local internet protocol access (LIPA) network entity and user equipment (UE), adapted to a cross-LIPA communication situation getting involved with a UE end, a visiting LIPA network entity end ($LIPA_V$), and a home LIPA network entity end ($LIPA_H$), and comprising: successfully registering to a CN by said UE end via said $LIPA_V$, to attain mutual trust relationship of said UE end and said $LIPA_V$;

successfully registering to said CN by said UE end via said $LIPA_H$, to attain mutual trust relationship of said UE end and said $LIPA_H$; and requesting said UE end by said $LIPA_H$ for re-authentication and successfully re-authenticating said UE end via said $LIPA_V$, to attain mutual trust relationship of said $LIPA_V$ and said $LIPA_H$, wherein a mutual authentication of said UE end, said $LIPA_V$, and said $LIPA_H$ is attained by a user end triggered authentication procedure, wherein said mutual authentication procedure comprises:

sending a specific message to said $LIPA_H$ by said $LIPA_V$ to trigger said UE end to authenticate to said CN with said $LIPA_V$ and said $LIPA_H$ being involved, and said $LIPA_H$ forwarding said specific message to said CN, to enable said CN to authenticate said UE end;

in an existing universal mobile telecommunications system authentication and key agreement procedure, adding forwarding functions to said $LIPA_H$ and said $LIPA_V$, including sending a user authentication request message by said $LIPA_V$, forwarding a user authentication request message by said $LIPA_H$, and forwarding a user authentication response message by said $LIPA_V$; and in an existing security mode control procedure, adding another forwarding function to said $LIPA_H$ and said $LIPA_V$, including forwarding a security mode command message by said $LIPA_H$, and forwarding a security mode completion message by said $LIPA_V$.

2. The authentication method as claimed in claim 1, wherein said UE end represents one or more UEs, said $LIPA_V$ represents one or more visiting LIPA network entities, said $LIPA_H$ represents one or more home LIPA network entities.

3. The authentication method as claimed in claim 1, wherein the mutual authentication of said UE end, said $LIPA_V$, and said $LIPA_H$ is attained by an authentication procedure which is triggered by a RAU procedure in addition with a serving radio network subsystem (SRNS) relocation procedure.

4. An authentication method for local internet protocol access (LIPA) network entity and user equipment (UE), adapted to a cross-LIPA communication situation getting involved with a UE end, a visiting LIPA network entity end ($LIPA_V$), and a home LIPA network entity end ($LIPA_H$), and comprising:

successfully registering to a CN by said UE end via said $LIPA_V$ to attain mutual trust relationship of said UE end and said $LIPA_V$; successfully registering to said CN by said UE end via said $LIPA_H$, to attain mutual trust relationship of said UE end and said $LIPA_H$; and requesting said UE end by said $LIPA_H$ for re-authentication and successfully re-authenticating said UE end via said $LIPA_V$, to attain mutual trust relationship of said $LIPA_V$ and said $LIPA_H$, wherein a mutual authentication of said UE end, said $LIPA_V$, and said $LIPA_H$ is attained by an authentication procedure which is triggered by a simplified routing area update (RAU) procedure, wherein said authentication procedure triggered by said simplified RAU procedure comprises:

sending a specific message of a RAU request by said $LIPA_V$ to said $LIPA_H$, to trigger said UE end to authenticate to said CN end with said $LIPA_V$ and said $LIPA_H$ being involved, forwarding said specific message of the RAU request to said CN by said $LIPA_H$, and verifying the content information of said specific message by said CN;

in an existing universal mobile telecommunications system authentication and key agreement procedure, adding forwarding functions to said $LIPA_H$ and said $LIPA_V$, including forwarding a user authentication request message by said $LIPA_H$, forwarding a user authentication response message to said $LIPA_H$ by said $LIPA_V$, and forwarding a user authentication response message to said CN by said $LIPA_H$;

in an existing security mode control procedure, adding another forwarding functions to said $LIPA_H$ and said $LIPA_V$, including forwarding a security mode command message by said $LIPA_H$, and forwarding a security mode completion message by said $LIPA_V$; and sending a RAU response to said $LIPA_H$ by said CN, and forwarding said RAU response to said $LIPA_V$ by said $LIPA_H$ to complete said simplified RAU procedure.

5. The authentication method as claimed in claim 4, wherein said authentication procedure triggered by said RAU procedure with a serving radio network system (SRNS) relocation procedure comprises:

performing said SRNS relocation procedure, including requesting said $LIPA_V$ for the communication service data of said UE end kept in said $LIPA_V$ by said CN, sending to said CN said communication service data of said UE end kept in said $LIPA_V$ by said $LIPA_V$, and requesting said $LIPA_H$ by said CN to prepare corresponding communication service resources;

performing a security procedure by said UE end, said $LIPA_V$, said $LIPA_H$, and said CN for key generation, exchange, and storage; and performing exchanging communication service data of said UE end between said $LIPA_V$ and said $LIPA_H$, then forwarding a RAU response message to said $LIPA_V$ by said $LIPA_H$ to complete said RAU procedure.

6. The authentication method as claimed in claim 4, wherein said RAU response at least contains an updated UE ID, a valid location information of said updated UE ID, and a verification code for determining the legitimacy and the authenticity of said updated UE ID.

7. The authentication method as claimed in claim 4, wherein said RAU request message at least contains a temporary UE ID, a valid location of said temporary UE ID, and a verification code of said temporary UE ID.

* * * * *